US006288863B1

(12) United States Patent
Flinsbaugh

(10) Patent No.: US 6,288,863 B1
(45) Date of Patent: Sep. 11, 2001

(54) DYNAMICALLY PROGRAMMABLE MAGNETO-RESISTIVE HEAD WRITE AND READ BIAS CURRENTS

(75) Inventor: Jack W. Flinsbaugh, San Jose, CA (US)

(73) Assignee: Seagate Technology LLC, ScottsValley, CA (US)

( * ) Notice: Subject to any disclaimer, the term of this patent is extended or adjusted under 35 U.S.C. 154(b) by 0 days.

(21) Appl. No.: 09/557,247

(22) Filed: Apr. 24, 2000

Related U.S. Application Data

(63) Continuation of application No. 08/849,332, filed as application No. PCT/US95/17028 on Dec. 28, 1996, now Pat. No. 6,122,127.
(60) Provisional application No. 60/003,316, filed on Sep. 6, 1995.

(51) Int. Cl.[7] ................... G11B 5/03; G11B 5/09
(52) U.S. Cl. ................................. 360/66; 360/46
(58) Field of Search ......................... 360/66, 46

(56) References Cited

U.S. PATENT DOCUMENTS

| 4,799,112 | 1/1989 | Bremmer et al. . | |
|---|---|---|---|
| 5,107,378 | 4/1992 | Cronch et al. . | |
| 5,132,852 | 7/1992 | Price, Jr. . | |
| 5,262,907 | 11/1993 | Duffy et al. . | |
| 5,270,882 | 12/1993 | Jove et al. . | |
| 5,367,411 | 11/1994 | Nishiyama et al. . | |
| 5,600,500 | 2/1997 | Madesen et al. . | |
| 5,719,719 | 2/1998 | Tsuyoshi et al. . | |
| 5,726,821 | 3/1998 | Cloke et al. . | |
| 6,091,562 | * 7/2000 | Yamakoshi et al. .......... | 360/66 |

FOREIGN PATENT DOCUMENTS

| A 0 425 064 | 5/1991 | (EP) . |
|---|---|---|
| A 0 467 615 | 1/1992 | (EP) . |

OTHER PUBLICATIONS

[Author] anonymous; Preamplifier for Magnetoresistive Heads Using Series Voltage Bias, IBM Technical Disclosure Bulletin, Jan., 1989, pp. 383–384, vol. 31, No. 8, New York, US.

* cited by examiner

*Primary Examiner*—Regina Y. Neal
(74) *Attorney, Agent, or Firm*—Crowe & Dunlevy

(57) ABSTRACT

Apparatus and method for dynamically programming the magnitude of read bias and write currents in a disc drive head (30A, 30B). A digital input value is provided to a register (80) of a digital to analog converter (76, 78), the digital input value indicative of the desired magnitude of the head current. A multiplier (82) of the digital to analog converter (76, 78) multiplies the digital input value by a reference voltage to generate an output voltage. The differential voltage between the reference voltage and the output voltage controls the source to drain resistance of a transistor (106) connected in series with a preamp voltage source (114, 120) of a preamp circuit (70). By inputting different digital input values, the source to drain resistance of the transistor (106), and hence the magnitude of the current generated by the preamp voltage source (114, 120), are precisely controlled. The magnitude of the head current is provided as a multiple of the magnitude of the current generated by the preamp voltage source (114, 120). During a read operation, the read bias current is provided to the head (30A, 30B) and the effects of flux transitions on the read bias current are decoded by a read channel (68) to retrieve the data stored on the disc drive. During a write operation, the polarity of the write current is controlled by a write channel circuit (66) operating in conjunction with the preamp circuit (70) to write the data to the disc (16A, 16B).

1 Claim, 3 Drawing Sheets

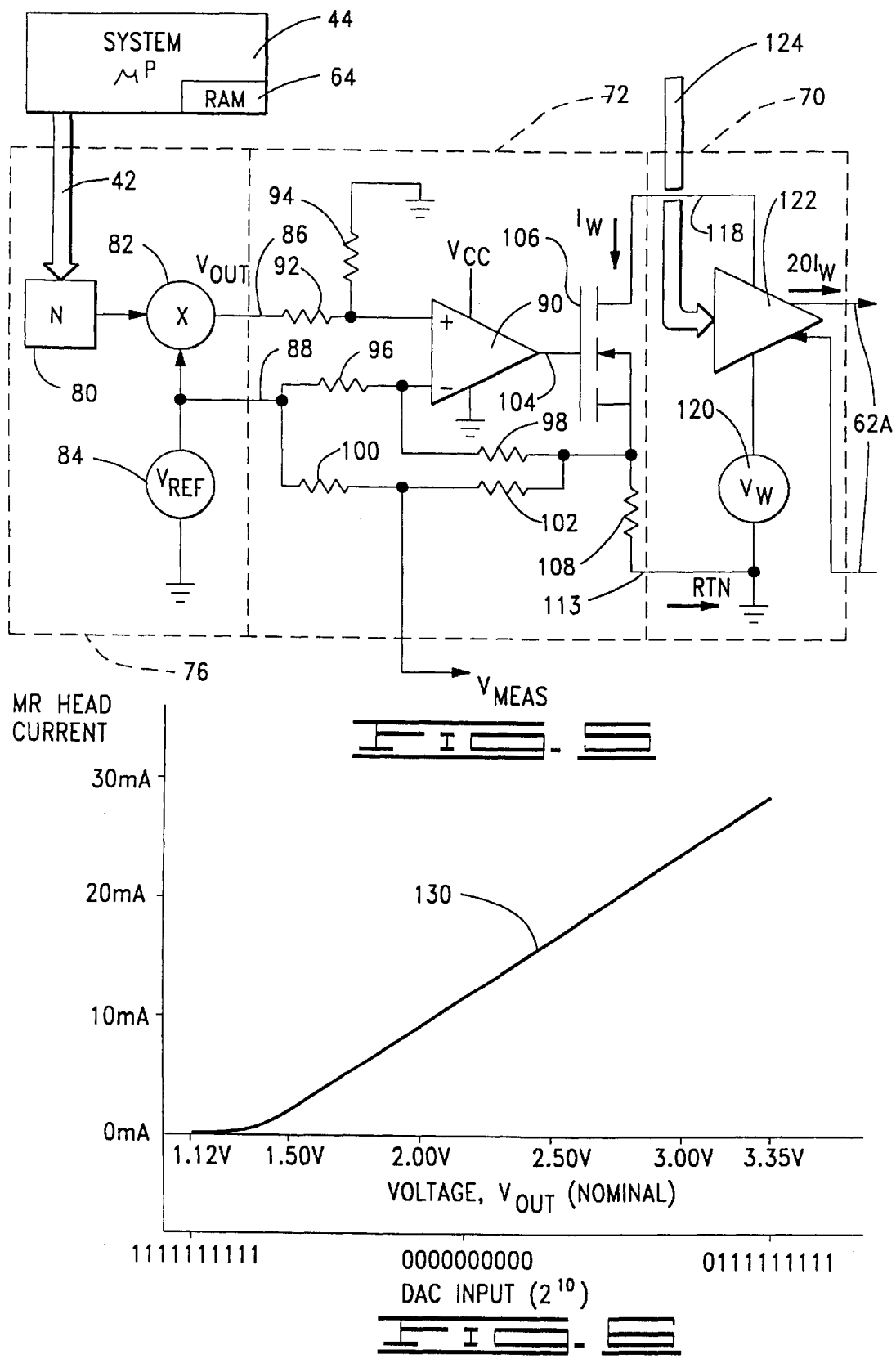

DYNAMICALLY PROGRAMMABLE MAGNETO-RESISTIVE HEAD WRITE AND READ BIAS CURRENTS

This invention was filed under 35 U.S.C. 371 of PCT/US95/17028 filed on Dec. 28, 1996 and is a continuation of U.S. application Ser. No. 08/849,332 filed Jun. 4, 1997, now U.S. Pat. No. 6,122,127. This application claims benefit of provisional application No. 60/003,316 filed Sep. 6, 1995.

TECHNICAL FIELD

This invention relates generally to the field of disc drive data storage devices, and more particularly, but not by way of limitation, to an apparatus and method for dynamically programming write and read bias currents in a disc drive magneto-resistive head.

BACKGROUND ART

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Typically, the heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disc drive.

Of the variety of head constructions presently used in modern disc drives, magneto-resistive heads (hereinafter "MR heads") are of particular interest. MR heads include the use of a thin film element which has the characteristic of having a changed DC resistance in the presence of a magnetic field of a predetermined orientation. Taking advantage of this characteristic, MR heads generally perform a read operation by passing a bias current through this thin film element and detecting changes in this bias current as a result of exposure of the thin film element to the flux transitions from the data track (as the resistance of the thin film element is changed thereby). These changes in the bias current are subsequently decoded by the read channel in order to reconstruct the data that was previously stored on the track. Generally, the MR heads write data to the track using an inductive writing technique, whereby a write current of a selected magnitude and polarity is passed through the head in order to selectively magnetize portions of the data track.

Typically, MR heads have two pairs of electrical connections, one pair for the write element portion of the head and one pair for the read element portion of the head, with each pair of connections comprising a current source and a current return path. Thus, during a read operation, one pair of the connections is used to pass the read bias current through the thin film element of the MR head and time-varying changes in the read bias current are detected by AC sense circuitry; during a write operation, the other pair of connections is used to provide the write current to the head in order to selectively magnetize the data track.

It is well known that the utilization of MR heads has led to further improvements in data storage capabilities of modern disc drives, in that increased areal densities (that is, the number of storage elements per square unit of disc surface, presently quantified in megabits per square inch) have been achieved partially in response to the use of such MR heads. As market forces continue to provide economic incentive for pushing the areal density design envelope, it is increasingly desirable to optimize the performance of MR heads in new disc drives.

Performance problems have been encountered, however, in these efforts to continually increase areal density. Because of a variety of factors encountered in modern disc drives, it is generally desirable to vary both the write current and the read bias current, both from drive to drive and with respect to location of the head over the disc surface. Such factors influencing the read and write performance of the drives include, for example, variations in the flight height of the heads with respect to the disc radius, changes in the linear velocity of the disc with respect to disc radius, the skew of the slider with respect to the data track, the throat height of the head, changes in data transfer rates with respect to disc location and general head/media tolerances inherent in high volume disc drive manufacturing processes.

Efforts have been made in the prior art to optimize currents passed through heads to address these affects; see, for example, U.S. Pat. No. 4,799,112 entitled METHOD AND APPARATUS FOR RECORDING DATA, issued Jan. 17, 1989 to Bremmer et al. (which discloses zone based recording) and U.S. Pat. No. 5,107,378 entitled ADAPTIVE MAGNETIC RECORDING AND READBACK SYSTEM, issued Apr. 21, 1992 to Cronch et al. (which discloses write current optimization). Both these are assigned to the assignee of the present application and are incorporated herein by reference.

However, with continued efforts to increase areal density in disc drive designs, there remains a need for an improved approach to dynamically control the write and read bias currents in a disc drive employing the use of MR heads.

DISCLOSURE OF THE INVENTION

The present invention comprises a method and apparatus for dynamically programming MR head currents in a disc drive. Particularly, in the preferred embodiment of the invention, a microprocessor provides a digital input value to a register of a digital to analog converter, the digital input value indicative of the desired magnitude of the head current. A multiplier multiplies the digital input value by a reference voltage to generate an output voltage, and the differential voltage between the reference voltage and the output voltage controls the source to drain resistance of a transistor connected in series with a preamp voltage source of a preamp circuit. By inputting different digital input values, the source to drain resistance of the transistor, and hence the magnitude of the current generated by the preamp voltage source, are precisely controlled.

The magnitude of the head current is provided as a multiple of the magnitude of the current generated by the preamp voltage source. Thus, during a read operation, the resulting read bias current is provided to the head and the effects of flux transitions on the read bias current are decoded by conventional read channel circuitry to retrieve the data stored on the disc drive. Correspondingly, during a write operation, the polarity of the resulting write current is controlled in a conventional manner by write control circuitry operating in conjunction with the preamp circuitry.

An object of the present invention is to support the attainment of increased areal densities in disc drive designs.

Another object of the present invention is to compensate for factors affecting the read and write performance of a disc drive in order to achieve improved performance and reduce read and write error rates.

Yet another object of the present invention is to dynamically program the write and read bias currents in a disc drive in order to optimize MR head performance.

Still another object of the present invention is to precisely control the desired head current levels while compensating for the effects of voltage drift during disc drive operation.

Other objects, advantages and features of the present invention will be apparent from the following description when read in conjunction with the drawings and appended claims.

BRIEF DESCRIPTION OF THE DRAWINGS

FIG. 5 is a detailed schematic diagram showing the operation of the write transconductance amplifier circuit, the digital to analog converter and the preamp circuit of FIG. 3.

FIG. 6 is a graphical representation of the magnitude of the current passed through the MR head of FIG. 3 in response to digital inputs provided to the digital to analog converters of FIG. 3.

BEST MODE OF CARRYING OUT INVENTION

Figure 1:
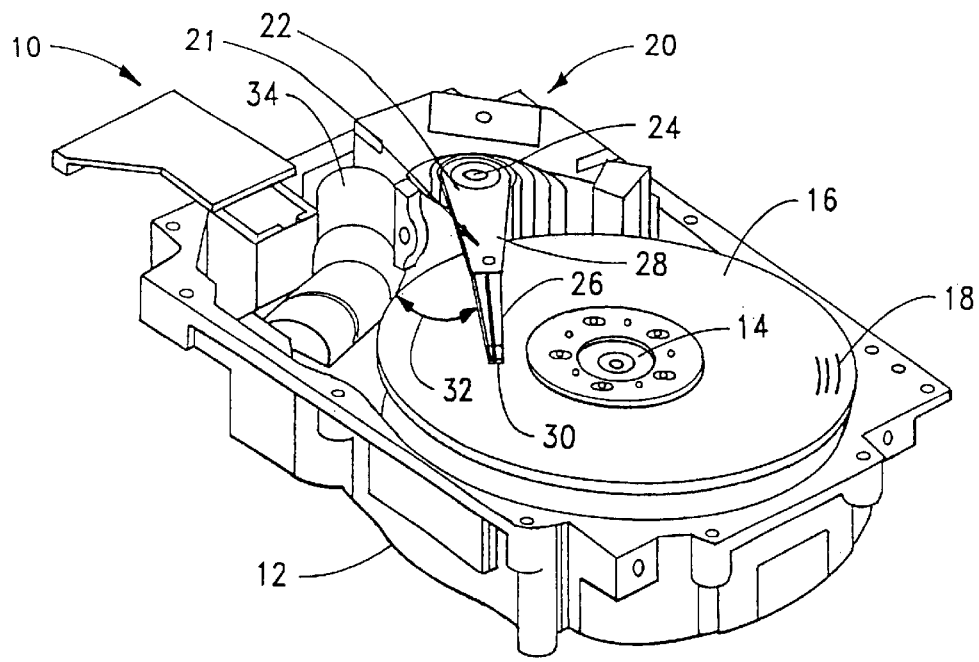
FIG. 1 is a perspective view of a disc drive constructed in accordance with the present invention.

Turning now to the drawings and more particularly to FIG. 1, shown therein is a perspective view of a disc drive 10 constructed in accordance with the present invention. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). An array of heads (one shown at 30) is mounted to an actuator assembly 21 by way of flexures 26, which are attached to head arms 28 of an actuator body 22. The actuator assembly 21 is adapted for pivotal motion about a pivot shaft 24 under control of a voice coil motor (VCM), shown generally at 20.

The VCM 20 is driven by electronic circuitry (not shown in FIG. 1) to controllably move the heads 30 to any desired one of a plurality of concentric circular tracks 18 on the discs 16 along arcuate path 32. Signals used to control the VCM 20, as well as signals to and from the heads 30, are passed via a flex circuit 34.

Figure 2:
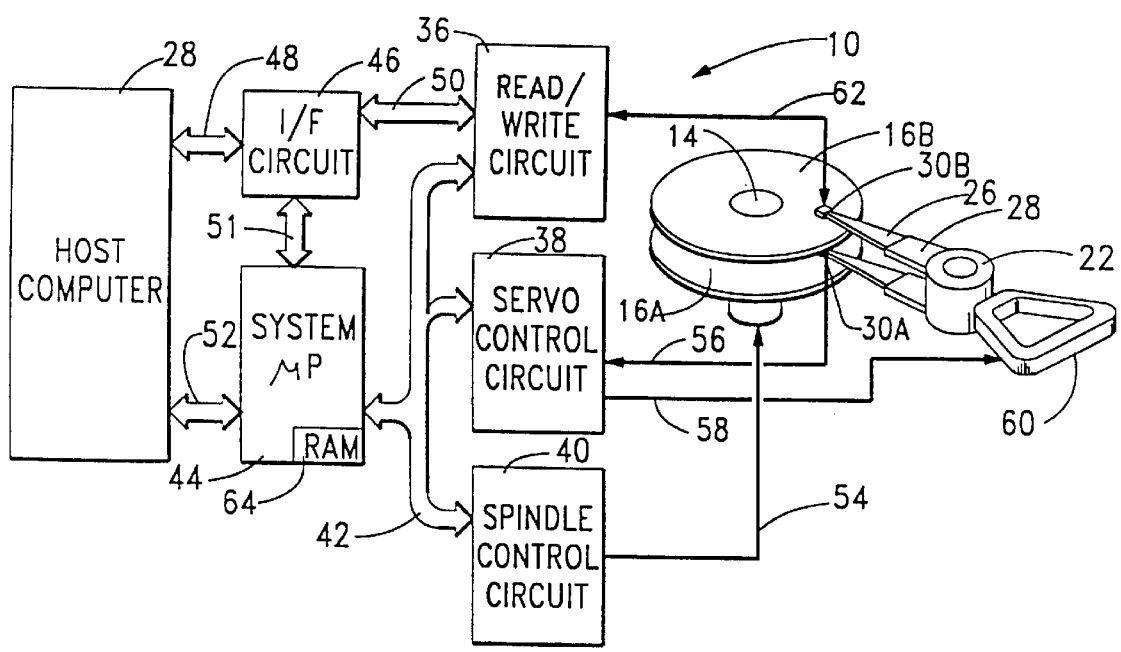
FIG. 2 is a functional block diagram of the disc drive of FIG. 1.

Referring now to FIG. 2, shown therein is a simplified functional block diagram of the disc drive 10 of FIG. 1, operably connected to a host computer 28. More particularly, FIG. 2 shows the disc drive 10 to generally comprise a read/write circuit 36, a servo control circuit 38 and a spindle control circuit 40, all operably connected by way of control bus 42 to a system microprocessor 44. It will be recognized that the control bus 42 comprises the necessary connections for the system microprocessor 44 to communicate with and control these disc drive circuits. Additionally, an interface circuit 46 is shown connected to the read/write circuit 36 (by way of signal path 50) and to the system microprocessor 44 (by way of signal path 51), with the interface circuit 46 serving as a data interface for the disc drive.

As will be recognized, the spindle control circuit 40 controls the rotational speed of the spindle motor hub 14 and discs 16A, 16B by way of a spindle motor (not separately shown), as generally indicated by signal path 54. As the construction and operation of the spindle control circuit 40 are conventional, these will not be further discussed herein.

The servo control circuit 38 of FIG. 2 is shown to receive servo position information from a head 30A by way of signal path 56 and, in response thereto, provides a correction signal by way of signal path 58 to an actuator coil 60 in order to position the heads 30A, 30B with respect to the discs 16A, 16B. The actuator coil 60 interacts with the permanent magnets of the VCM 20 as described hereinabove, but for purposes of clarity these permanent magnets are not shown in FIG. 2. As will be recognized, in a dedicated servo system the head 30A would comprise a servo head, dedicated to providing generally continuous servo positioning information to the servo control circuit 38 with the corresponding surface of the disc 16A serving as a dedicated servo surface. In such a dedicated servo system, the remaining heads (30B being the only other head shown in FIG. 2) would comprise data heads and would be used to transfer data to and from the remaining discs during write and read operations, respectively.

Alternatively, it will be recognized that in an embedded servo system, each of the heads 30A, 30B would serve as both servo and data heads, with both servo information and data being stored on the tracks of the discs 16A, 16B. In an embedded servo system, connections would generally be provided from each of the heads 30A, 30B to the servo control circuit 38 as well as to the read/write circuit 36. However, it will be recognized that the present invention does not depend on the use of a particular type of servo system; thus for clarity of illustration, a dedicated servo system has been generally illustrated in FIG. 2. For more discussion regarding the construction and operation of a typical dedicated servo control circuit, see U.S. Pat. No.

5,262,907 entitled HARD DISC DRIVE WITH IMPROVED SERVO SYSTEM, issued Nov. 16, 1993 to Duffy, McKenzie, Heydari and Woods, assigned to the assignee of the present invention and incorporated herein by reference.

Finally, the read/write circuit 36 passes data to be written to and read from the disc 16B, respectively, by way of signal path 62 and the head 30B. That is, in response to a write command received by the system microprocessor 44 from the host computer 28 (by way of a command bus 52), the system microprocessor 44 controls the flow of data to be written to disc from the host computer 28 to the interface circuit 46 (by way of an external data bus 48) and from the interface circuit 46 to the read/write circuit 36 (by way of an internal data bus 50). The read/write circuit 36, in turn, provides a write current to the head 30B by way of the signal path 62 in order to write the data by selectively magnetizing selected data tracks on the disc 16B.

Likewise, in response to a read command from the host computer 28, the head 30B detects flux transitions from the selected data tracks on the disc 16B and provides an analog read signal to the read/write circuit 36, which in turn converts the analog read signal to digital form and performs the necessary decoding operations to provide the data read from the disc 16B to the interface circuit 46 for output to the host computer 28. In controlling these various operations of the disc drive, the system microprocessor 44 includes the use of programming stored in system microprocessor RAM 64.

Having concluded an overview of the disc drive functional block diagram of FIG. 2, reference will now be made to FIG. 3, which shows a functional block diagram of the read/write circuit 36 of FIG. 2, operably connected to the head 30B which is designated as an MR head.

As provided hereinabove, the read/write circuit 36 generally operates to transfer data to and from the data tracks of disc 16B (as shown in FIG. 2) by way of the head 30B; more particularly, the read/write circuit 36 shown in FIG. 3 comprises a write channel 66, a read channel 68 and a preamp circuit 70. These components are conventional and it will be recognized by those skilled in the art that the write channel 66 generally operates to encode the data supplied from the interface circuit 46 (by way of the internal data bus 50) and instruct the preamp circuit 70 to output a time-varying write current to the head 30B in order to write a representation of the input data to the disc 16B. As provided hereinabove, the head 30B is an MR head having two pairs of connection paths, one for writing and one for reading, and for reference these have been generally identified in FIG. 3 as 62A and 62B, respectively. Thus, the preamp circuit 70 provides the write current to the head 30B by way of paths 62A during a write operation.

Additionally, it will be recognized that the read channel 68 generally operates during a read operation to receive a read signal from the preamp circuit 70 and perform detection and decoding operations thereon in order to supply the retrieved data to the interface circuit 46 (of FIG. 2) by way of the internal data bus 50.

It will be apparent to those skilled in the art that the foregoing is a generalized description of disc drive data read and write operations and that additional considerations may exist for these operations, depending upon the particular configuration of the disc drive. For example, as described hereinabove, a disc drive employing the use of an embedded servo system generally includes the placement of both data fields and servo fields on each track; thus, a "write operation" in such a disc drive may be considered to include both the writing of data to the data fields on the data track (on a sector basis), as well as the intermittent reading of servo information from the servo fields (in order to maintain the position the heads with respect to the track). In other words, those skilled in the art will recognize that a "write operation" in a disc drive having an embedded servo system generally comprises both the writing and the reading of data. However, for purposes of clarity herein, it will be understood that a "read operation" describes the sequence of actions taken by the disc drive to read data (whether user data or servo data) from the disc through the application of a read bias current to the head; correspondingly, a "write operation" describes the sequence of actions taken by the disc drive to write data to the disc through the application of a write current to the head.

Continuing with FIG. 3, the general operation of the write channel 66, the read channel 68 and the preamp circuit 70 disclosed therein are conventional, except as provided hereinbelow, and the arrowheads shown on the various signal paths between these circuits are provided for reference purposes only and do not necessarily represent the actual directions that signals may take between these circuits. It will be readily understood that the present invention, as claimed below, can be implemented with a variety of different types of read and write channels, including PRML read channels, as well as different types of preamp circuits, as long as these circuits support the use of MR heads. For clarity, the use of the term "MR head" herein applies to a disc drive head that uses write and read bias currents during write and read operations, respectively, and detects time-varying changes in the read bias current as a result of previously recorded flux transitions from a data track during a read operation. It will be readily understood, however, that the present disclosure applies not only to MR heads, but is also applicable to conventional thin film heads, as well as to GMR and spin-valve head technologies, among others, that operate in accordance herewith.

Figures 3, 4:
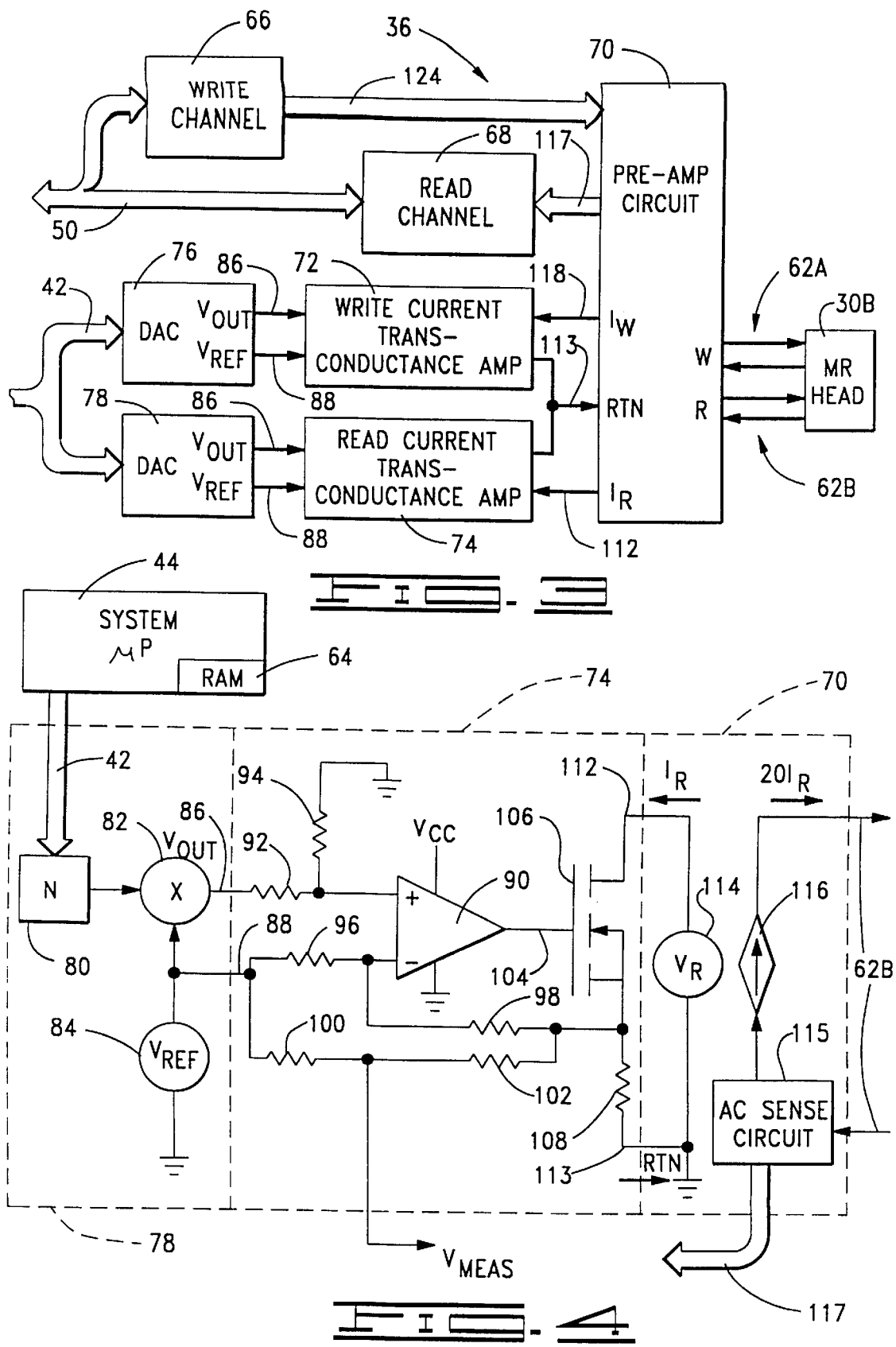
FIG. 3 is a functional block diagram of the read/write circuit of FIG. 2.
FIG. 4 is a detailed schematic diagram showing the operation of the read transconductance amplifier circuit, the digital to analog converter and the preamp circuit of FIG. 3.

Before continuing with a discussion of the remaining circuits shown in FIG. 3, it may be helpful to first provide an overview of the present invention, which is a method and apparatus for dynamically programming the magnitude of the current provided to a disc drive head. More particularly, preamp circuits, such as the preamp circuit 70 shown in FIG. 3, generally require an external resistance path in order to set the correct value for the write and read bias currents supplied to a head. Such preamp circuits typically have one or more internal voltage sources which provide currents that are regulated by the application of an external resistance, typically a discrete external resistor. The preamp operates as a "current mirror", in that the currents so provided from these internal voltage sources control the magnitude of the currents applied to the head. For reference, in the preferred embodiment the preamp circuit 70 of FIG. 3 comprises a VTC VM61312 Magneto-Resistive Head Read/Write Preamplifier from VTC Inc., Bloomington Minn., USA, and as configured, provides a current to the head that is generally 20 times the current provided by the internal voltage source.

Continuing with FIG. 3, also shown therein is a write current transconductance amplifier 72 and a read current transconductance amplifier 74, constructed in accordance with the present invention, hereinafter also collectively referred to as "amplifier circuits". The amplifier circuits 72, 74 are shown to be operably connected to the preamp circuit 70, as well as to a pair of digital to analog converters (DACs) 76 and 78. In the preferred embodiment, the amplifier circuits 72 and 74 as well as the DACs 76 and 78, respectively, have nominally identical construction, although this is not required and should not be considered to be a limitation. Additionally, in the preferred embodiment the DACs 76, 78 are implemented using an SSI 32H6521 Embedded Servo Controller from Silicon Systems, Inc., Tustin, Calif., USA.

As described in more detail below, during disc drive write operations, the amplifier circuit 72 and the DAC 76 cooperatively operate to regulate the current provided from an $I_W$ pin of the preamp circuit 70 in order to regulate the write current supplied to the head 30B (by way of paths 62A); similarly, during read operations, the amplifier circuit 74 and the DAC 78 cooperatively operate to regulate the current provided from an $I_R$ pin of the preamp circuit 70 in order to regulate the read bias current supplied to the head 30B (by way of paths 62B). The DACs 76, 78 each provide two voltage levels identified in FIG. 3 as $V_{OUT}$ and $V_{REF}$, respectively, to the amplifier circuits 72, 74, with the $V_{REF}$ voltage being a reference voltage and the $V_{OUT}$ voltage being digitally controlled. As will be discussed in more detail hereinbelow, the $V_{OUT}$ voltage is a voltage referenced with respect to the $V_{REF}$ voltage, and in the preferred embodiment the value of $V_{OUT}$ ranges from $0.5V_{REF}$ to $1.5V_{REF}$.

In order to more fully explain the construction and operation of the circuit of FIG. 3, FIG. 4 has been provided which comprises a detailed schematic diagram of the DAC 78, the read current transconductance amplifier 74 and selected portions of the preamp circuit 70. Referring to FIG. 4, also shown therein is the system microprocessor 44 (of FIG. 2) which provides a digital input value (by way of a portion of the control bus 42 of FIG. 2) to a register 80 of the DAC 78. The contents of the register 80 are shown to be provided to a multiplier 82, which also receives the $V_{REF}$ voltage as an input from a $V_{REF}$ voltage generator 84. In the preferred embodiment, the $V_{REF}$ voltage is a voltage of 2.23V±3% and the digital input value provided to the register 80 is a 10-bit word (in two's complement form, the MSB being a sign bit).

Thus, the multiplier 82 acts to multiply the $V_{REF}$ voltage by the digital input value from the register 80 and output the $V_{OUT}$ voltage, which as provided hereinabove nominally ranges from about 1.12V (which is $0.5V_{REF}$ nominal) to about 3.35V (which is $1.5V_{REF}$ nominal).

The $V_{OUT}$ voltage and the $V_{REF}$ voltage are provided to the amplifier circuit 74 on signal paths 86 and 88, respectively, and provide inputs as shown to an operational amplifier circuit comprising an operational amplifier 90 ("op amp") and resistors 92, 94, 96, 98, 100 and 102. It will be recognized that the $V_{OUT}$ voltage is generally presented to the + input of the op amp 90 and the $V_{REF}$ voltage is generally presented to the − input of the op amp 90 (neglecting resistor effects), in order to provide an output of the op amp 90 responsive to the differential voltage between the $V_{OUT}$ and the $V_{REF}$ voltages, as explained below. It will be recognized that the values of the resistors 92–102 may be varied as required for a particular applications, but for purposes of disclosure the preferred embodiment comprises use of the values listed in Table I:

TABLE I

| Resistor | Nominal Value |
| --- | --- |
| 92 | 59 kohms |
| 94 | 31.6 kohms |
| 96 | 133 kohms |

TABLE I-continued

| Resistor | Nominal Value |
| --- | --- |
| 98 | 37.4 kohms |
| 100 | 71.5 kohms |
| 102 | 100 kohms |

The use of these particular values of resistance comprise the preferred embodiment of the present invention, which has been incorporated into an application specific integrated circuit (ASIC). It will be recognized by those skilled in the art that relatively smaller resistances are generally desirable in an ASIC, as resistance is generally related to layout area, and larger resistances generally require correspondingly larger layout areas. However, the present invention may also be readily implemented using discrete resistors, in which case larger values for the resistors may be more desirable, for example, to decrease the effects of leakage current on the operation of the circuit.

Additionally, it will be recognized by those skilled in the art that the resistor 98 operates as a feedback resistor for the op amp 90, in conjunction with the resistors 100 and 102 which also serve to provide a signal denoted in FIG. 4 as $V_{MEAS}$. The $V_{MEAS}$ signal is a voltage measurement signal indicative of the differential voltage between the voltages $V_{OUT}$ and $V_{REF}$.

It is contemplated that the voltage $V_{MEAS}$ may be used as a means to independently measure the differential voltage provided to the amplifier circuit 74 by the DAC 78. Particulary, it is contemplated that the voltage $V_{MEAS}$ could be provided as an input to an analog-to-digital converter (not shown) to generate a digital representation of the voltage $V_{MEAS}$, which could in turn be monitored by the system microprocessor 44. The use of a high precision DAC, however, as in the preferred embodiment disclosed herein, will generally provide a sufficiently precise indication of the differential voltage without the need for an independent measurement, but the voltage $V_{MEAS}$ may be found useful in an implementation using a relatively lower precision DAC. Of course, the amplifier circuit 74 may be implemented without generating the voltage $V_{MEAS}$ at all (eliminating the need for resistors 100 and 102), as long as the values of the other resistors in the circuit are changed accordingly to provide the same effective resistance for the circuit.

Continuing with FIG. 4, as provided hereinabove, the op amp 90 provides an output in response to the differential voltage between the voltages $V_{OUT}$ and $V_{REF}$ and this output is provided on signal path 104 to the gate of an n-channel enhancement MOSFET 106 (hereinafter also referred to as "transistor 106"). The source-drain path of the transistor 106 is shown to be connected in series with a resistor 108 so as to cooperatively regulate the current (denoted in FIG. 4 as "$I_R$") provided on signal path 112 from a $V_R$ voltage source 114 of the preamp circuit 70; that is, the source to drain resistance of the transistor 106 is controllably varied to regulate the magnitude of the current $I_R$ (the return path of the current $I_R$ is identified in FIGS. 3 and 4 as signal path 113). The magnitude of the current $I_R$ supplied by the $V_R$ voltage source 114 controls the magnitude of the read bias current provided by the preamp circuit 70 to the head 30B by way of signal paths 62B; more particularly, FIG. 4 shows the preamp circuit 70 to comprise a current source 116 which supplies the read bias current (denoted in FIG. 4 as "$20_R$") having a magnitude 20 times the $I_R$ current supplied by the $V_R$ voltage source 114. For reference, the $V_R$ voltage source 114 provides a nominal voltage of 2.5V±6%.

Thus, as the resistance of the transistor 106 changes in response to the output signal from the op amp 90, the magnitude of the current $I_R$ and the read bias current will be correspondingly controlled. In the preferred embodiment, the resistor 108 (in series with the source-drain path of the transistor 106) is a precision resistor having a resistance of 576 ohms, with a 1% tolerance. It will be recognized that it is desirable to hold the resistance of the resistor 108 to a very precise tolerance, as a relatively large amount of variation in the resistance of the resistor 108 will degrade the ability of the amplifier circuit 74 to precisely control the magnitude of the current $I_R$. Thus, in the preferred embodiment, the resistor 108 is laser-trimmed to ensure the required tolerance is achieved.

It is significant to note that the circuit of FIG. 4 operates to precisely and instantaneously regulate the current $I_R$ in response to the digital input value from the system microprocessor 44, while accommodating changes in circuit parameters, including voltage drift in both the $V_{REF}$ voltage generator 84 of the DAC 78, as well as in the $V_R$ voltage source 114 in the preamp circuit 70. As provided hereinabove, the $V_{REF}$ voltage generator 84 outputs a voltage of 2.23V±3%, but as the $V_{OUT}$ voltage is provided with respect to the $V_{REF}$ voltage, the circuit operates to adaptively compensate for variations in the $V_{REF}$ voltage to maintain the desired read bias current. Likewise, the $V_R$ voltage source 114 outputs a voltage of 2.5V±6%, but the amplifier circuit 74 monitors the current $I_R$ and adjusts the source to drain resistance of the transistor 106 accordingly to maintain a constant steady-state current magnitude, thereby compensating for the effects of voltage drift from the $V_R$ voltage source 114.

Also shown in FIG. 4 is a conventional AC sense circuit 115 (of the preamp circuit 70) which monitors time-varying changes in the read bias current as a result of the passage of flux transitions under the thin film element of the head 30B. The AC sense circuit 115 provides indications of these time-varying changes in the read bias current (by way of signal path 117) to the read channel 68 of FIG. 3, which as provided hereinabove decodes these indications in order to provide the data stored on the disc 16B.

Turning now to FIG. 5, shown therein is a schematic diagram comprising the DAC 76, the write current transconductance amplifier 72 and selected portions of the preamp circuit 70 of FIG. 3, which operate to control the magnitude of the write current supplied to the head 30B. As provided hereinabove, in the preferred embodiment the DAC 76 generally has the same construction and operational characteristics as the DAC 78, and the amplifier circuit 72 generally has the same construction and operational characteristics as the amplifier circuit 74; thus, many of the same item numbers from FIG. 4 have been used to identify the corresponding components shown in FIG. 5 for these circuits. However, as the preamp circuit 70 operates in a somewhat different manner during a write operation as compared to a read operation, for purposes of clarity FIG. 5 has been provided herein.

As with the circuit of FIG. 4, FIG. 5 shows a digital input value is provided to the shift register 80 of the DAC 76 by the system microprocessor 44. The multiplier 82 multiplies this digital input value by the $V_{REF}$ voltage (generated by the $V_{REF}$ voltage generator 84) to generate the $V_{OUT}$ voltage, with the differential voltage therebetween being presented to the op amp 90 of the amplifier circuit 72 as shown. The output of the op amp 90 drives the gate, and hence the dc resistance, of the transistor 106. Thus, as with the circuit of FIG. 4, the amplifier circuit 72 operates to regulate the magnitude of a current $I_W$ supplied by a $V_W$ voltage source 120 on signal path 118. The voltage generated by the $V_W$ voltage source 120 is nominally 2.5V,±6%.

As shown in FIG. 5, the preamp circuit 70 further comprises a write current amplifier circuit 122 which receives the current $I_W$ and, in response thereto, outputs the write current to the head 30B by way of connection paths 62A. More particularly, the write current amplifier circuit 122 outputs the write current as an amplified value of the current $I_W$ having a polarity determined by an input signal provided by the write channel 66 (of FIG. 3) by way of signal path 124. As shown, the magnitude of the write current (denoted in FIG. 5 as "20 $I_W$") provided to the head 30B is 20 times the magnitude of the current $I_W$.

To now further illustrate the operation of the circuits of FIGS. 4 and 5 in regulating the read bias and write currents, respectively, FIG. 6 has been provided which shows a graphical representation of the current supplied to the MR head 30B of FIG. 3 in response to digital input values provided to either of the DACs 76, 78 of FIG. 3. More particularly, the graph of FIG. 6 is shown to have a vertical axis representing values of MR head current (which correspond to the values of the read bias current "20 $I_R$" in FIG. 4 and the write current "20 $I_w$" in FIG. 5). Additionally, the graph of FIG. 6 is shown to have two corresponding horizontal axes, with the first horizontal axis representing the nominal value of the voltage $V_{OUT}$ as it ranges from $0.5V_{REF}$ (nominally 1.12V) to $1.5V_{REF}$ (nominally 3.35V). As provided hereinabove, the voltage $V_{OUT}$ is referenced with respect to the voltage $V_{REF}$, so that the actual values of $V_{OUT}$ will depend upon the nominal value of $V_{REF}$; however, as explained above, the differential voltage between the $V_{OUT}$ and $V_{REF}$ voltages will not change with variations in $V_{REF}$.

The second horizontal axis shown in FIG. 6 represents the DAC digital input value which is provided to the register 80 by the system microprocessor 44. As provided above, in the preferred embodiment the DAC digital input value is a ten-bit word in two's complement form; thus, as shown in FIG. 6 the value 0000000000 represents the midrange value (and corresponds to a $V_{OUT}$ of $1.0V_{REF}$ or 2.23V), the value 1111111111 represents the minimum value within the range (and corresponds to a $V_{OUT}$ of $0.5V_{REF}$ or 1.12V), and the value 0111111111 represents the maximum value within the range (and corresponds to a $V_{OUT}$ of $1.5V_{REF}$ or 3.35V). It will be recognized that the DACs 76, 78 disclosed herein are ten-bit bipolar DACs, inasmuch as the value 1111111111 represents the minimum value and the value 0111111111 represents the maximum value for these DACs. Alternatively, unipolar DACs could be implemented instead of bipolar DACs, with a corresponding change to 0000000000 and 1111111111 as the minimum and maximum values, respectively. It will be recognized that a variety of DAC configurations and levels of precision are available and may be implemented as desired for each particular application.

Finally, plotted against these horizontal and vertical axes is a response curve 130, which represents the MR head current with respect to the voltage $V_{OUT}$ and the DAC input, respectively. An examination of the curve 130 reveals that the left-most, first portion of the curve 130 represents an initial MR head current of about 0 mA for a corresponding nominal $V_{OUT}$ voltage of from about 1.12V to about 1.30V. For voltages $V_{OUT}$ above about 1.50V, the curve 130 is shown to be essentially linear, with a maximum MR head current of about 28 mA being supplied with a corresponding $V_{OUT}$ voltage of about 3.35V. Thus, the magnitudes of the MR head read bias and write currents can be precisely programmed from 0 mA to about 28 mA. Further, these head current magnitudes will be precisely controlled and maintained, independent of subsequent changes in circuit parameters encountered during operation.

Having concluded a discussion of the graph of FIG. 6, reference will now be made to the FIGS. 2–5 in order to provide a detailed example of the operation of the circuits shown therein during write and read operations. Beginning with a write operation, the host computer 28 sends a read command (with appropriate address and data information) to the disc drive 10. The system microprocessor 44, in response thereto, instructs the servo control circuit 38 to perform a seek of the actuator assembly 21 to position the head 30B over the appropriate data track on the disc 16B. At this time the digital input value for the selected data track is determined, and this may be accomplished in a variety of ways.

For example, in disc drives employing the use of zone based recording (such as disclosed in the previously incorporated Bremmer reference), the digital input value may be predetermined on a zone basis, so that the digital input value is optimized for all the tracks in each zone on the disc (the tracks in each zone having the same number of sectors), in such a case, the appropriate digital input value is retrieved for the zone containing the selected data track and the system microprocessor 44 provides this digital input value to the DAC 76.

Alternatively, the digital input value may be calculated with respect to track radius (such as disclosed in the previously incorporated Cronch reference) based on initially determined write current magnitudes for tracks at the inner and outer diameters of the disc, respectively. In such a case, the appropriate digital input value is calculated from these values using, for example, linear or exponential interpolation.

In yet another alternative, the optimum write current may be optimized using minimization techniques disclosed in U.S. Pat. No. 5,687,036 entitled WRITE CURRENT OPTIMIZATION IN A DISC DRIVE issued Nov. 11, 1997 to Kassab, assigned to the assignee of the present application and incorporated herein by reference, which discloses optimizing write current levels across the disc surface based on minimizing the occurrence of hard read errors during manufacturing testing.

It will be recognized that the optimal digital input value for a particular write operation may be obtained using any of these, or other suitable methodologies, but once so obtained, the digital input value is provided to the register 80 of the DAC 76. Additionally, it will be readily apparent that, particularly in disc drives employing the use of embedded servo systems, it may be desirable to have a servo microprocessor (not shown) which may be part of the servo control circuit 38 provide the digital input value to the DAC 76, instead of the system microprocessor 44 as disclosed. Regardless, once the digital input value is so entered, the circuit of FIG. 5 operates to regulate the magnitude of the write current provided to the head 30B; that is, the data provided by the host computer 28 (as encoded) is written to the selected data track by the write channel 66, preamp circuit 70 and the head 30B through the controlled switching of the polarity of the write current.

Similarly, during a read operation, the host computer 28 provides the necessary command to the disc drive 10 (including appropriate addressing information) and, in response thereto, the servo control circuit 38 positions the head 30B over the selected data track and the system microprocessor 44 provides an appropriate digital input value to the register 80 of the DAC 78. As with the write current discussed above, a variety of methodologies may be used to determine the appropriate digital input value in order to program the magnitude of the read bias current. As the appropriate sectors on the selected data track subsequently pass under the head 30B, the AC sense circuit 115 detects the effects of flux transitions on the read bias current from the stored data on the data track and provides the corresponding signal to the read channel 68 in order to provide the retrieved data to the host computer 28.

For purposes of the appended claim, the claimed "head bias current application means" will be understood consistent with the foregoing discussion to correspond to the structure of the disclosed write and read current transconductance amplifier circuits 72, 74, the digital to analog converters (DACs) 76, 78, and the microprocessor 44 with associated memory 64 shown in FIGS. 3–5, which cooperate to multiply an input value representative of a desired value of head current by a reference voltage to provide an output voltage, and then adjust the magnitude of the head current in relation to a differential voltage between the reference voltage and the output voltage, thereby enabling different magnitudes of head current for different head locations. Circuits that do not multiply an input value representative of a desired value of head current by a reference voltage to provide an output voltage, and then adjust the magnitude of the head current in relation to a differential voltage between the reference voltage and the output voltage, thereby enabling different magnitudes of head current for different head locations, are explicitly excluded as nonequivalent structures under 35 U.S.C. §112, sixth paragraph, and are therefore excluded as not covered by the claim.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A disc drive, comprising:

a head adjacent a rotatable disc; and head bias current application means, operably coupled to the head, for applying a bias current to the head having a magnitude established in relation to an input value indicative of a desired magnitude of the bias current.

* * * * *